(12) United States Patent
Woolard et al.

(10) Patent No.: US 6,234,665 B1
(45) Date of Patent: May 22, 2001

(54) APPARATUS AND METHOD OF FORMING BIOLOGICALLY STABLE SOYA FLOUR SUSPENSION

(75) Inventors: Douglas John Woolard, Alconbury Weston; James McCaig, Giffnock; Charles Anthony Sutcliffe, Towcester, all of (GB)

(73) Assignee: AB Ingredients Limited, Northampton (GB)

( * ) Notice: Subject to any disclaimer, the term of this patent is extended or adjusted under 35 U.S.C. 154(b) by 0 days.

(21) Appl. No.: 09/288,032

(22) Filed: Apr. 8, 1999

(30) Foreign Application Priority Data

Apr. 8, 1998 (GB) .................................................. 9807617

(51) Int. Cl.[7] ................................. B01F 5/02; B01F 3/12; A21D 2/02; A21D 2/40
(52) U.S. Cl. ........................ 366/163.2; 366/137; 426/653
(58) Field of Search ............................. 366/163.2, 137.1, 366/136, 137, 139; 426/46, 335, 654, 653, 656, 519, 532

(56) References Cited

U.S. PATENT DOCUMENTS

| 4,517,218 | * | 5/1985 | Yackel, Jr. et al. . |
| 5,141,757 | * | 8/1992 | Ho Dac et al. . |
| 5,164,213 | * | 11/1992 | Bonkowski . |
| 5,211,475 | * | 5/1993 | McDermott ........................ 366/163.2 |
| 5,344,619 | * | 9/1994 | Larwick et al. ................... 366/163.2 |
| 5,476,320 | * | 12/1995 | Taguchi et al. ...................... 366/137 |
| 5,549,922 | * | 8/1996 | Juchem ................................. 426/618 |
| 5,858,449 | * | 1/1999 | Crank et al. . |
| 5,947,596 | * | 9/1999 | Dowd ................................ 366/163.2 |

FOREIGN PATENT DOCUMENTS 2 336 093 * 10/1999 (GB) .

* cited by examiner

*Primary Examiner*—Tony G. Soohoo
(74) *Attorney, Agent, or Firm*—Dykema Gossett PLLC

(57) ABSTRACT

This invention relates to a biologically stable soya flour suspension and to a method of forming such a suspension. More particularly, the invention provides a slurry of soya flour in an aqueous liquid wherein the aqueous liquid is brine. The invention further provides a method of forming a microbiologically stable slurry of soya flour comprising the step of pumping brine through a nozzle of a jet pump and the step of adding soya flour to an intake of the jet pump so as to produce a mixing of the soya flour and brine in a mixing chamber of the jet pump. Furthermore, apparatus is provided for forming said slurry of soya flour, the apparatus comprising a storage tank; a jet pump; means for supplying brine to a nozzle of the jet pump; means for supplying soya flour to an intake of the jet pump and means for delivering the resultant soya flour slurry to the storage tank. A soya flour liquid mixture is thereby provided which is microbiologically stable and which allows convenient ingredient measuring without discharging dust into the air.

5 Claims, 1 Drawing Sheet

View 'A'

APPARATUS AND METHOD OF FORMING BIOLOGICALLY STABLE SOYA FLOUR SUSPENSION

Figure 1:
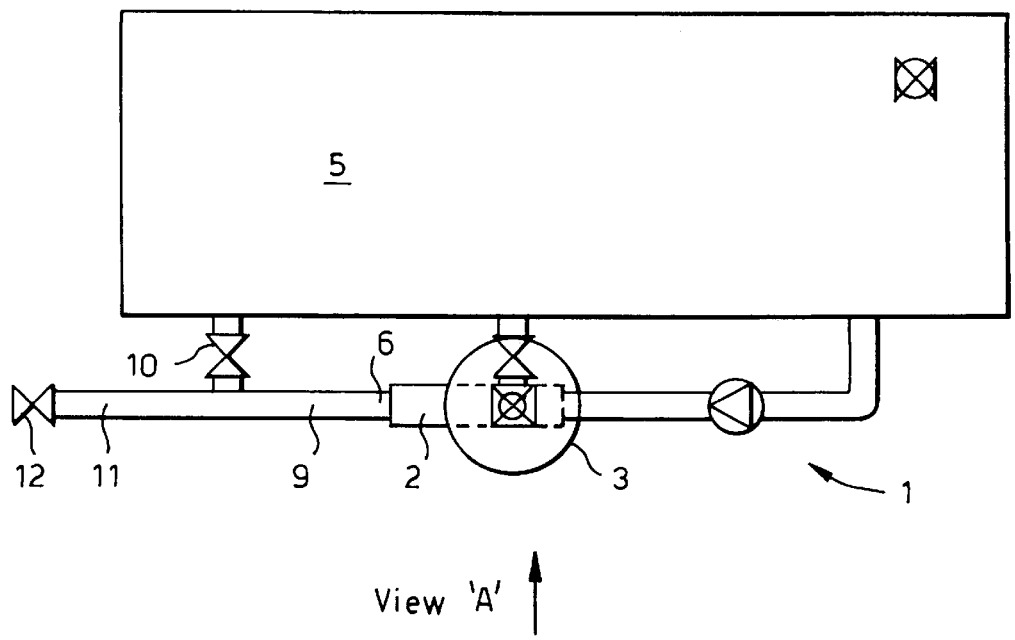

This invention relates to a biologically stable soya flour suspension and to a method of forming such a suspension. In its broadest aspect, the invention also relates to an improved bakery practice which eliminates or substantially eliminates the use of dry ingredients in the preparation of bakery products.

Commercial bakery practice consists essentially of batch mixing of basic ingredients, forming the resultant mixture into shaped products, and baking the products. The particular ingredients used in the original batch mix, the range of operation necessary to form the product, and the baking temperature and conditions will vary from product to product, but in all cases the process starts with the batch mixing of basic ingredients.

Heretofore, most of the ingredients used (with the exception of water) have been supplied to the bakery in solid form and are weighed to provide the correct quantity for each batch mix. The weighing of solid ingredients is a relatively time consuming and labour intensive operation and unless extreme care is taken can lead to errors in the quantities of materials used in the mix. Further, some of the materials required are supplied in the form of finely divided powders and the liberation of such powders into the air which occurs when powders are weighed and added to a batch mix is highly undesirable.

Many of the problems outlined above could be overcome if the ingredients required were available in liquid or paste form. Such ingredients could be measured using liquid/paste metering techniques and accordingly the conventional weighing operation would be eliminated. Further, the use of liquids rather than finely divided powders would eliminate the problem of dust.

As a practical matter, in order to be of commercial use a liquid ingredient must either be inherently stable so that it can be supplied by the manufacturer in liquid form and stored at the bakery in liquid form, or it must be capable of being readily mixed at the bakery and remain usable for 24 hours after mixing. If a product is usable for less than 24 hours the risk of contamination of the product and/or the need for frequent mixing of fresh batches makes use of the liquid ingredient unacceptable. Whilst it is known how to achieve delivery of most ingredients in an acceptable liquid or paste form it has heretofore not been possible to provide soya flour in this form.

Soya flour is used extensively in the baking of bread and other baked products. As will be appreciated by those skilled in the art soya flour provides protein, includes oils to enrich the product, adds softness to the finished product, whitens the crumb of bread products and has anti-staling characteristics. Soya flour is, however, a problem when it comes to effecting the above described desire to provide bakery ingredients in liquid form. Soya flour can be mixed with oil to form a pumpable slurry. However, this is not an acceptable material for use in a commercial bakery because the enzyme content of the soya flour will rapidly attack the oil causing rancidity. Because of this, a soya/oil slurry will remain useful for an unacceptably short period after mixing. Soya flour has a high oil and high protein content and readily clumps together. For this reason, it cannot easily be formed into a uniform mixture with water. Further, a soya flour/water mixture is well known to be microbiologically unstable and such a mixture would not be acceptable for use in commercial bakeries because of the unacceptably short period within which it would have to be used after mixing.

We have now discovered that the problem of microbiological instability of soya flour/water mixture can be overcome if an appropriate quantity of salt is dissolved in the water. Since salt is itself required in all bakery products in which soya flour is also used, provided that the relative quantity of soya flour and salt in each unit volume of mixture is correct the mixture can be measured to provide simultaneously the required soya flour and at least part of the required salt. If additional salt is required this may be added by metering additional brine into the mixing vessel.

Accordingly, a first aspect of the present invention provides a microbiologically stable slurry of soya flour in an aqueous liquid which is characterised in that the aqueous liquid is brine.

The presence of salt, in quantities which can be dissolved in water to form brine, has been found to be sufficient to inhibit microbiological growth in the slurry. If maximum resistance to microbiological growth is required saturated brine may be used. This will typically contain 26% salt at temperatures likely to be encountered in a commercial bakery. It is believed, however, that a lower salt content than 26% may be sufficient to inhibit microbiological growth for periods acceptable in commercial terms, and accordingly the present invention is not limited to the use of saturated brine solution as the liquid content of the slurry.

As mentioned above, because of the high oil content of soya flour it is difficult to disperse it in an aqueous base. We have found, however, that satisfactory mixing of the flour with brine can be achieved by use of a jet pump as a mixer.

Accordingly, a second aspect of the invention provides a method of forming a microbiologically stable soya flour slurry comprising pumping brine through the nozzle of a jet pump and adding soya flour to the intake of the jet pump to produce mixing of the soya flour and brine in the mixing chamber of the jet pump.

It is envisaged that in most bakery installations it will be desirable to make a single batch of soya flour slurry which will service the requirements of the bakery for several hours. For a bakery having a large baking capacity and operating substantially continuously it will probably be necessary to produce several mixes in any 24 hour period. However, in a small bakery a single mix may provide all the soya flour slurry required in a 24 hour period. In all installations a storage tank for the soya flour slurry will be required and means will be needed to prevent the soya flour slurry from settling out of the brine so that a homogenous mixture is presented to the metering device when slurry is required for the batch of mix.

Accordingly, a further aspect of the present invention provides an installation for forming a microbiologically stable soya flour slurry comprising: a storage tank; a jet pump; means for supplying brine to the nozzle of the jet pump; means for supplying soya flour to the inlet to the jet pump and means for delivering the resultant soya flour slurry to the storage tank. Preferably, in order to keep the soya flour in suspension means are provided for removing soya flour slurry from the tank and for delivering such slurry to the nozzle of the jet pump.

The action of removing soya flour slurry from the tank, passing it through the jet pump, and returning it to the tank will tend to keep the soya flour in suspension. Preferably, a single pump with associated valve gear is used for both delivering brine to the jet pump during the initial mixing phase and for recirculating the slurry through the jet pump to maintain the soya flour in suspension. The same pump may be used to deliver soya flour slurry from the storage tank when it is required for use.

In many bakeries, a brine installation exists to provide brine for bakery processes. If this is the case, brine for the purposes of the present invention may be derived from that installation. Alternatively, a brine installation may be installed for the purposes of this invention.

It is, however, conceivable that the apparatus according to the present invention may be used to form the brine solution as well as mixing the soya flour with brine solution. To this end, the brine solution may be formed either before soya flour is added, by adding salt to the jet pump inlet whilst fresh water is pumped through the jet pump, or simultaneously with the addition of soya flour by supplying both salt and soya flour to the jet pump inlet whilst fresh water is supplied to the nozzle. By either of these expedients the invention may be operated without the provision of a separate brine installation.

Figure 2:
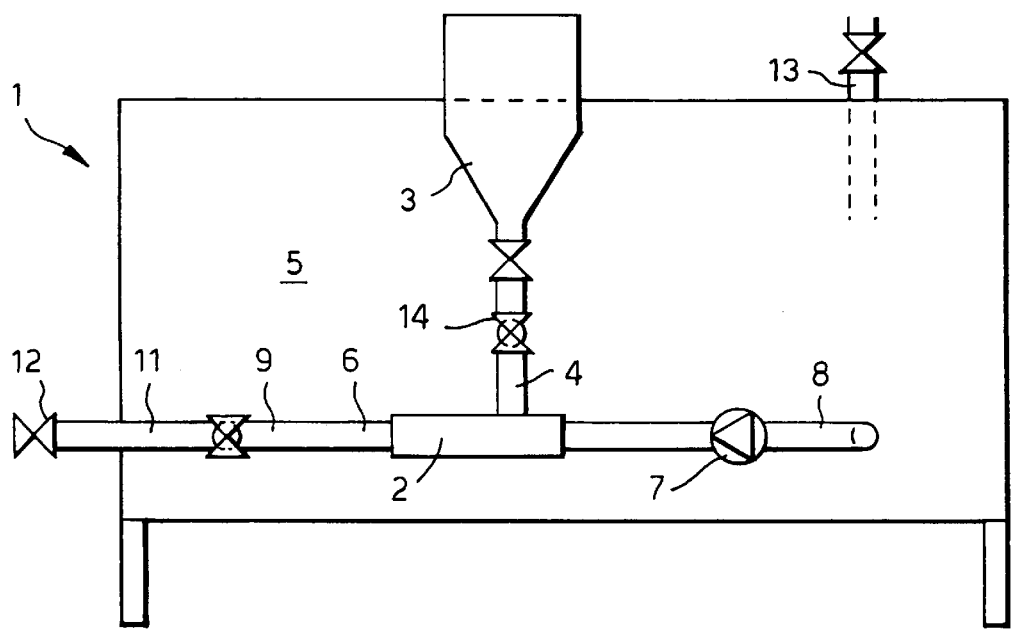

The invention will be better understood from the following description of a preferred embodiment thereof given by way of example only, reference being had to the accompanying drawing wherein:

FIG. 1 is a top plan view of an installation for the production of soya flour slurry; and FIG. 2 is a view in the direction of the arrow "A" of FIG. 1.

The drawing illustrates schematically a plant for the production and temporary storage of a soya flour slurry. The installation will be sized such that each batch of slurry produced will last its associated bakery installation for several hours. It is envisaged that in general a quantity of slurry will be made which is of such a size that it will all be used in not more than 16 hours. The slurry will however remain microbiologically stable for at least 24 hours to provide an appropriate safety margin.

The installation 1 comprises a jet pump 2, a soya flour storage hopper 3 mounted above the intake 4 of the jet pump, and a storage tank 5 connected to the outlet 6 of the jet pump.

The jet pump is preferably a GENFLO (registered trade mark) jet pump as supplied by Genflo U.K. Limited of 12 Brook Road, Bicton Industrial Park, Kimbolton, Huntingdon PE18 0EY England. Such jet pumps are conventionally used for the pumping of solids such as, for example, sand.

The nozzle of the jet pump is supplied from a pump 7 which derives its intake from the tank 5 via a pipe 8. The outlet 6 of the jet pump is connected to the tank 5 by a pipe 9 and valve 10. A branch 11 of the pipe 9 allows slurry to be delivered from the installation via a valve 12.

In use, a batch of soya flour slurry will be prepared by firstly placing an appropriate quantity of soya flour, for example 250 kg, in the storage hopper 3 and by placing an appropriate quantity of brine in the tank 5. The storage hopper may be furnished with means for weighing the content thereof, or may be filled from pre-weighed containers. The brine is supplied to the tank 5 via a brine supply pipe 13 and the quantity supplied may be measured by flow meter or by weighing the contents of the tank.

Once the tank 5 has been charged with brine and the hopper 3 has been charged with soya flour, the valve 10 is opened and the pump 7 started. The valve 14 controlling the connection between the flour hopper 3 and the intake 4 of the jet pump 2 is then opened. Brine flowing through the nozzle of the jet pump will entrain soya flour from the storage hopper via the intake of the jet pump.

When all the soya flour has been entrained the valve 14 will be closed but the pump 7 will continue to operate so that slurry is circulated from the storage tank through the jet pump nozzle and back into the storage tank. This circulation will produce a uniform suspension of soya flour and will assist in maintaining the soya flour in suspension.

Once the suspension has been thoroughly mixed it may be delivered to plant requiring the slurry via appropriate metering equipment by opening the delivery valve 12, closing the recirculating valve 10, and operating the pump 5.

The various operations of the valves and pumps required may be controlled manually, or may be placed under programme control.

Although the present invention has been described with particular reference to a batch mixing process it is to be understood that, in its broadest aspect, the invention is applicable to a continuous mixing process and to a soya slurry produced by such a continuous mixing process. Further, although the invention has been described with particular reference to soya flour alone it is to be understood that the invention is equally applicable to soya flour mixed with other ingredients and indeed the use of soya flour mixed with other bakery ingredients may be a particularly desirable material for use in the present invention.

What is claimed is:

1. A method for forming a microbiologically stable slurry of soya flour comprising the step of pumping brine through a nozzle of a jet pump and the step of adding soya flour to an intake of the jet pump so as to produce a mixing of the soya flour and brine in a mixing chamber of the jet pump.

2. An apparatus for forming a microbiologically stable slurry of soya flour comprising:

a storage tank;

a jet pump;

means for supplying brine to a nozzle of the jet pump;

means for supplying soya flour to an intake of the jet pump; and means for delivering the resultant soya flour slurry to the storage tank.

3. An apparatus as claimed in claim 2, wherein means are provided for removing soya flour slurry from the tank and for delivering such slurry to the nozzle of the jet pump.

4. An apparatus as claimed in claim 3, wherein the means for supplying brine to the jet pump during the mixing phase and the means for removing soya flour slurry from the tank and for delivering such slurry to the jet pump comprises the same pump.

5. An apparatus as claimed in claim 4, wherein said same pump is in association with valve gear; and said same pump delivers soya flour slurry from the storage tank as required.

\* \* \* \* \*